Feb. 5, 1963 G. F. PAULUS 3,076,234
PROCESS OF MAKING A DECORATIVE COVERING HAVING A WEAR LAYER
Filed Nov. 18, 1957
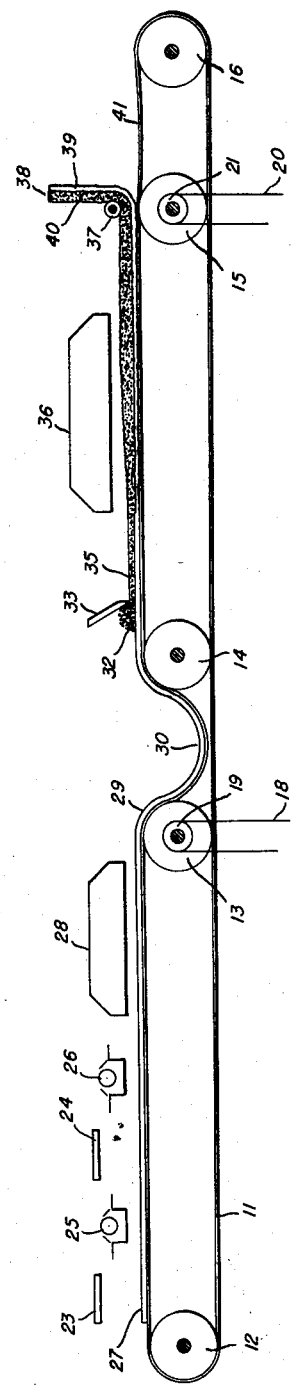
INVENTOR.
GEORGE F. PAULUS
BY
ATTORNEY

United States Patent Office 3,076,234
Patented Feb. 5, 1963

3,076,234
PROCESS OF MAKING A DECORATIVE COVERING HAVING A WEAR LAYER
George F. Paulus, West Orange, N.J., assignor to Congoleum-Nairn Inc., Kearny, N.J., a corporation of New York
Filed Nov. 18, 1957, Ser. No. 697,000
4 Claims. (Cl. 18—59)

This invention relates to the manufacture of flexible surface coverings which have a plastic decorative wear layer.

In accordance with the present commercial practice, flexible plastic surface coverings having a wear layer containing a thermoplastic synthetic resinous binder, plasticizers, pigments and fillers are widely used as coverings for floors, walls, vehicle interiors and the like in the form of sheets or tiles. Vinyl resins such as polyvinyl chloride and its copolymers, particularly vinyl chloride copolymerized with invyl acetate, are most commonly used in formulating synthetic resinous binders used in the production of such plastic surface coverings. When resins are blended with plasticizers, pigments, fillers and the like and sheeted, products with excellent wearing properties and resistance to attack by ordinary household chemicals are produced. These products have an unusual clarity and brilliance of color, and the relatively low cost of vinyl resins make them ideally suited for production of surface coverings having a large market.

A widely used method of applying a decorative effect to a surface covering product is by means of printing. The technique of flat bed printing an oleoresinous enamel paint decoration upon a saturated felt backing has been used commercially for at least fifty years to produce products commonly referred to as printed felt base. These products have the desirable feature of being low in cost and can be readily manufactured in many different designs. In spite of every effort to control the flow characteristics of the printing enamels used, minor irregularities quite frequently are found in the surface of conventional printed felt base products. Also the decorative enamel paint film tends to become worn when subject to abrasion after the product is installed with the result that the service life of such products is comparatively short in areas of high traffic.

Print paints have been formulated with vinyl resinous binders and used in the manufacture of printed floor coverings. Products so prepared have improved wearing qualities compared to conventional printed felt base products having an enamel paint wearing surface. However, complete levelling of the printed film is even more difficult to attain when using vinyl print paints as compared to standard printing enamels.

Conventional printed felt base products suffer a further disadvantage in that they have a relatively hard surface due to the lack of appreciable resilience in the saturated felt backing. From the standpoint of greater comfort to those who must stand on such products for extended periods of time, a backing with improved resilience and cushioning characteristics would be highly desirable. A layer of foam rubber can be laminated to the backing of a conventional printed felt base product but the bond between the foam layer and the felt backing presents an area of potential delamination in the finished product. Also, such a product tends to suffer from the inherent disadvantage of all felt-backed products, that is, incomplete recovery of original thickness after removal of a heavy load.

It is an object of the invention to produce a plastic surface covering having an unusually smooth wearing surface characterized by long service life. Another object of the invention is to produce a decorative surface covering having a highly resilient backing integrally fused and bonded to the wearing surface thereof showing substantial resistance to delamination. A further object of the invention is to produce a highly resilient smooth and glossy surface covering product which exhibits excellent recovery properties after removal of a heavy load.

In accordance with the invention, a decorative surface covering is produced by printing a thermoplastic resinous composition in the form of a design upon a polished carrier surface, fusing the printed film and then stripping the product from the surface. Prior to stripping, a foamable plastic layer can be applied to the printed film and the product heated to fuse the two layers to each other to form a unitary sheet and to expand the foam. The invention is illustrated on the accompanying drawing which shows a schematic representation of one embodiment of the production of a glossy resilient plastic surface covering in accordance with the invention.

With reference to the drawing, a thin metal belt 11 with slotted edges passes over and is engaged by the teeth in wheels 12, 13, 14, 15 and 16. The wheels 13, 15 are driven by power applied through belts 18, 20 to pulleys 19, 21 respectively. Standard printing blocks 23, 24 with associated paint supply pots 25, 26 apply a printed film 27 to the belt. The film is set by passing under a heating unit 28 to yield a set film 29. After the sheet passes through a slack loop section 30, a mass of foamable plastic composition 32 is applied to the set film in the form of a uniform layer 35 by means of a doctor blade 33. The composite mass passes beneath a heating unit 36 wherein the two layers become fused together and the upper layer foams. The product is allowed to cool and is stripped from the belt by passing over a roll 37. A smooth and glossy highly resilient product 38 with a decorative surface 39 and a foam backing 40 passes to storage.

In operation, and carrier belt is driven in a stepwise intermittent manner by the wheel 13 and in a continuous manner by the wheel 15. The two slack loops 30 and 41 are provided to change the intermittent belt motion beneath the printing blocks to a continuous motion during application of the foamable layer and during fusion. The printing operation is carried out in the conventional manner of flat bed printing machines. In operation the carrier belt 11 moves in stepwise fashion beneath the printing blocks. When the sheet is in motion, the paint pots reciprocate longitudinally beneath the printing blocks and deposit a film of paint on the printing surfaces of the blocks. The motion of the belt then stops and the printing blocks are all depressed depositing the decorative film upon the carrier belt. The blocks are cut so that each block applied a different color of the design in the conventional manner of a flat bed printing machine. The belt carries the printed film through the oven where the film becomes set. The sheet motion is then changed to continuous for greater control of foamable layer application and subsequent fusion and foaming. The finished product leaves the fusion oven and is stripped from the metal belt, the surface of which imparts to the product the desired finish.

The surface upon which the design is printed in accordance with the invention has a smooth surface. It can be polished to any degree depending on the character of the surface appearance desired in the finished product. Thus, products varying in appearance from a low sheen to a high gloss can be produced. The carrier surface can be coated with a conventional releasing fluid, such as a silicone, a wax, a salt of a heavy metal with high molecular weight fatty acids such as aluminum stearate and zinc palmitate and the like. A useful releasing agent is a complex compound of the Werner type in which a trivalent nuclear chromium atom is coordinated with an acyclic carboxylic acido group having at least 10 carbon atoms. Such materials are described and claimed in U.S. Patent 2,273,040, granted February 17, 1942. Alternately a thin layer of a release paper, that is a paper sheet impregnated with a release fluid, can be placed on the carrier surface and the printed decoration applied thereto. In some cases, no releasing medium need be used on the carrier surface if it is thoroughly cooled prior to the stripping of the product therefrom at the end of the process.

The carrier surface can be in the form of an endless belt as shown on the drawing where a surface covering is produced in accordance with applicant's invention in a continuous process. The carrier surface can also be in the form of a slab or other appropriate configuration if desired. The preferred material is metal, since a metal carrier surface is strong and durable, yet flexible and can be polished to any degree desired. The carrier can also be a form of other materials, such as plastic, rubber and the like. The carrier must be capable of withstanding temperatures up to at least 400° F. without being deformed, and must be flexible if an endless belt carrier is used.

The decorative layer which is initially applied to the carrier belt is a layer of thermoplastic resinous composition. Suitable compositions comprise a thermoplastic resinous binder and a compatible plasticizer or mixture of plasticizers. The resinous binder must be one that is coalesced or fused into a continuous film by the application of heat. The preferred resinous binders are the vinyl resins, but other thermoplastic resins can be used such as polymers and copolymers of acrylic acid and methacrylic acid and their derivatives, polystyrene, polymerized methyl styrene, polybutadiene and the like. The thermoplastic resinous composition is conventionally applied by printing where a multicolored decorative effect is desired as illustrated in the drawing, but where a one color decorative layer is desired, the composition can be applied by any conventional coating technique. For such fluid application, the resinous binder is dispersed in a dispersion medium, which can be water to form an aqueous latex, but the preferred dispersion medium is a fluid plasticizer for the thermoplastic resin, or a mixture of plasticizer and volatile solvent. Such dispersions of resin are conventionally termed as plastisols, and where solvent is present, an organosol.

Plastisols and organosols are dispersions of a thermoplastic resin in the form of fine particles. In a plastisol, the dispersion medium is a plasticizer for the resin. In an organosol, the dispersion medium is a mixture of plasticizer and solvent. Such dispersions have appreciable fluidity at normal room temperatures but are converted by heat into a flexible, tough thermoplastic mass. This ultimate result is brought about by the process of fusion wherein the resin becomes plasticized and solvated by the plasticizer.

Polymers of vinyl chloride have been found to be particularly effective in formulating plastisol and organosol decorative compositions for use in the invention. The vinyl chloride polymers can either be simple, unmixed homopolymers of vinyl chloride or copolymers thereof in which the essential polymeric structure of polyvinyl chloride is interspersed at intervals with the residues of other ethylenically unsaturated compounds copolymerized therewith. The essential properties of the polymeric structure of polyvinyl chloride will be retained if not more than 40 percent of another monomer is copolymerized therein. Suitable monomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ester, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethyl-butadiene-1,3, piperylene, divinyl ketone and the like.

Resins adaptable for use in formulating vinyl chloride plastisols and organosols are commonly referred to as dispersion grade resins. Such resins are available having particle sizes of from 0.02 to about 2 microns in contrast to calender grade vinyl chloride resins which are available in particles ranging up to 35 microns in size. Dispersion grade resins are usually of higher molecular weight than calender grade resins and have particle surfaces of a hard, horny nature.

Polymers of vinyl chloride having specific viscosities above about 0.17 and preferably between 0.17 and 0.31 as measured in a solution of 0.2 gram of resin in 100 milliliters of nitrobenzene at 20° C. are particularly effective.

In the determination of specific viscosities the sample of resin in nitrobenzene solution maintained at a temperature of 20° C. is allowed to flow between two calibrated marks in a pipette and time required is recorded. This time is compared with the time required for a control of pure nitrobenzene solvent to pass between the same two marks, also at a temperature of 20° C. The specific viscosity is determined as the sample flow time divided by the control flow time, minus 1. The specific viscosity is an effective measure of relative molecular weight of the polymer, the higher the specific viscosity the higher being the molecular weight.

The selection of the plasticizer is important in determining the strength and flexibility of the wearing surface of the printed surface covering and also in influencing the viscosity and viscosity stability of the decorative composition. Esters of straight and branched chain alcohols with aliphatic acids impart low viscosity and good viscosity stability to a plastisol. Typical plasticizers of this type include dibutyl sebacate, dioctyl sebacate, dioctyl adipate, didecyl adipate, dioctyl azelate, triethylene glycol di (2-ethylhexanoate), diethylene glycol dipelargonate triethylene glycol dicaprylate and the like. Plasticizers of the aromatic type, such as esters of aliphatic alcohols and aromatic acids or aromatic alcohols and aliphatic acids or aromatic alcohols and aromatic acids are also useful although their use is limited by their tendency to yield plastisols of excessive viscosity. Typical plasticizers of this type include dibutyl phthalate, dicapryl phthalate, diactyl phthalate, dibutoxy ethyl phthalate, dipropylene glycol dibenzoate, butyl benzyl sebacate, dibenzyl sebacate, dibenzyl phthalate and the like. Other types of plasticizers, such as esters of inorganic acids, including tricresyl phosphate, actyl diphenyl phosphate and the like, alkyd derivatives of rosin, chlorinated paraffine, high molecular weight aromatic hydrocarbon condensates and the like can also be used. The plasticizer or blend of plasticizers is chosen to yield a decorative composition of the desired viscosity. In addition, the plasticizer should have a low vapor pressure at the temperatures required to fuse the resin. A vapor pressure of 2 millimeters of mercury or less at 400° F. is satisfactory.

Suitable decorative compositions for use in the invention have a viscosity of about 200 to about 25,000 centipoises at 25° C. as measured with a Brookfield viscometer using a No. 6 spindle at 10 r.p.m. Plastisols and organosols within this viscosity range can be formed into a controlled thickness film by means of a doctor blade and can be applied by printing. Where the decorative composition is printed onto the carrier by means of the flat-bed printing method, a viscosity range of 500 to 10,000 centipoises is preferred.

In the formulation of plastisol decorative compositions for use in the invention, the fine particle size resin in uniformly dispersed in a mass of fluid plasticizer. The fluidity of plastisols is influenced in part by the particular resin and plasticizer selected but is also a function of the ratio plasticizer to resin. Plastisols become less fluid as the ratio of plasticizer to resin is reduced. Plastisol printing fluids for use in the invention contain from about 50 to about 150 parts plasticizer per 100 parts resin with a range of 60 to 100 parts plasticizer per 100 parts resin being particularly effective.

Organosols useful as decorative compositions in the production of products in accordance with the invention contain about 50 to about 150 parts plasticizer per 100 parts resin. The organosol composition also contains from about 1 to about 80 parts of volatile organic solvent per 100 parts of resin with the amount being chosen in accordance with the particular viscosity desired. Such solvents as xylene, toluene, cyclohexanone, methyl ethyl ketone, methyl isobutyl ketone and the like are useful.

Minor amounts of stabilizers which are incorporated to reduce the effects of degradation by light and heat are present in the composition. Suitable light stabilizers include resorcinol disalicylate, resorcinol dibenzoate, phenyl phthalate, phenyl benzoate, o-tolyl benzoate, eugenol, guaiacol, o-nitrophenol, o-nitraniline, triethylene glycol salicylate, and organic phosphates and other complexes of such metals as barium, cadmium, strontium, lead, tin and the like. Suitable heat stabilizers include sulfides and sulfites of aluminum, silver, calcium, cadmium, magnesium, cerium, sodium strontium and the like, glycerine, leucine, alanine, o- and p-amino benzoic and sulfanilic acids, hexamethylene tetramine, weak acid radicals including oleates, recinoleates, abietates, salicylates and the like. Normally, the printing fluid contains from 0.5 to 5 parts stabilizer per 100 parts resin. The particular stabilizers chosen should not impart excessive viscosity to the printing composition.

The decorative composition contains pigments in accordance with the particular color desired. Where a multi-colored decorative effect is created in accordance with the invention, separate batches of printing fluid for each of the colors desired are needed. Any of the organic and inorganic pigments well known in the art for pigmenting resinous compositions can be used. Normally, from 0.5 to 5 parts pigments per 100 parts resin are used.

The decorative plastisol or organosol film applied to the carrier belt by printing or coating passes through an oven in order that it becomes set and thereby attains sufficient mechanical strength to withstand subsequent processing steps. Heating the printed film to a temperature of about 200° F. or higher brings about this result which is caused by partial solvation of the resin by the plasticizer. The composition gels and becomes set, that is stiff and in a condition of complete rest and not flowable, although not completely fused and hence not having attained its ultimate strength. Organosols having as low as 20 parts plasticizer per 100 parts resin can be used. However, when an organosol having less than 50 parts plasticizer per 100 parts resin is used, the composition must be fused after application to the carrier to insure the formation of a smooth film without cracks.

The set decorative film still in contact with the carrier base, leaves the oven and passes to the next processing step, that is the application of the foamable layer. For optimum control of the foaming operation, it is necessary that sheet motion in this part of the process be continuous in contrast to the intermittent sheet motion if the decorative composition is applied by flat bed printing. Slack loops or festooning systems can be used in order to make this conversion.

The set decorative film is allowed to cool and a layer of foamable composition is applied thereto. This is most conventionally done by means of a conventional doctor blade whereby a controlled thickness film of foamable composition is applied to the printed film. The foamable layer is formulated by the addition of a blowing agent to a conventional plastisol composition. The plastisol is formulated as described above in connection with the preparation of a plastisol decorative composition but contains in addition, an effective amount of a blowing agent.

The larger the amount of blowing agent, within practical limits, used the greater is the expansion of the foam. Foam densities of from 50 percent to 10 percent of the density of the unblown plastisol can be readily attained. Such results are attainable with from about 1 to about 20 parts blowing agent per 100 parts resin with from 2 to 10 parts blowing agent per 100 parts resin being particularly effective for the production of foams of a density which are most desirable for use in producing surface coverings in accordance with the invention.

Complex organic compounds which when heated decompose to yield an inert gas and have residues which are compatible with the resin used in the plastisol are used as blowing agents. Such materials have the property of decomposition over a narrow temperature range which is particularly desirable for obtaining a good foam structure. Compounds having the N—N and —N=N— linkages decompose at elevated temperatures to yield an inert gas high in nitrogen. Typical compounds include substituted nitroso compounds, substituted hydrazides, substituted azo compounds and the like, such as are tabulated below:

| Blowing agent: | Decomposition temperature, ° F. |
|---|---|
| P,P'-oxybis-(benzenesulfonyl hydrazide) | 300–320 |
| N,N' - dimethyl-N,N'-dinitroso terephthalamide | 200–220 |
| Dinitrosopentamethylenetetramine | 355–375 |
| Azodiformamide | 370–390 |

Blowing agents for use in the invention must be decomposed at a temperature below the decomposition temperature of the resin used. Therefore, in the case of plastisols formulated with the preferred vinyl chloride polymers, a blowing agent decomposing below 450° F. must be used. The minimum initial decomposition temperature must be sufficiently high that no premature gas evolution occurs during formulation of the plastisol and subsequent processing. Any premature decomposition of the blowing agent renders the application of a uniform layer to the carrier difficult. In addition, the minimum initial decomposition temperature of the blowing agent should be above the temperature at which the plastisol attains some strength through gelation. In the case of the preferred vinyl chloride polymer plastisols, the minimum initial decomposition temperature of the blowing agent should be at least 200° F.

The use of a blowing agent which does not begin to decompose until the fusion temperature of the polymer is particularly effective in the production of products in accordance with the invention. When a high temperature blowing agent of this type is used, such as azodiformamide, the decorative and foamable layers of the product become integrally bonded together into a unitary sheet prior to any foaming of the foamable layer and the resins in both layers become fused. The fusion of the resins prior to foaming is advantageous from the standpoint of obtaining adequate heat transfer into the composition layers to effect fusion. A resinous foam layer has best insulating properties because of the plurality of minute gas cells making up the foam structure. Thus foaming prior to fusion could so inhibit heat transfer into the lower decorative layer so that the resin in the decorative composition layer might not become completely fused. This would result in an imperfect product.

When the foamable layer is to be applied by the preferred doctor blade technique, the plastisol containing the blowing agent should have a viscosity at 25° C. from about 200 to 25,000 centipoises as measured with a Brookfield viscometer using a No. 6 spindle at 10 r.p.m. Foamable plastisols having higher viscosities can be used although the high viscosity necessitates the use of a technique such as calendering for film formation. Foamable plastisols for use in the invention normally have from 50 to 150 parts plasticizer per 100 parts resin.

Although it is preferred that the foamable composition be applied as a fluid, by use of the doctor blade technique, sheet formation can be by any conventional technique such as calendering, pressing and the like. When this is done, care must be taken that the plastisol is not subjected to excessive temperatures during sheet formation to prevent premature decomposition of the blowing agent or fusion of the composition.

The composite sheet comprising a set decorative film and a foamable layer applied thereto is heated in order to foam the plastisol base and fuse the compositions of the two layers into a unitary sheet. It is necessary that the product be heated to the fusion temperature of the resinous compositions used and also to a sufficiently high temperature that the glowing agent in the foamable plastisol is decomposed. Depending on the decomposition temperature of the particular blowing agent used foaming can either occur before fusion, simultaneously with fusion or after fusion. For reasons already presented it is desirable to use a high temperature blowing agent in the plastisol base composition. Under these conditions, foaming does not occur until the resinous compositions have been substantially completely fused.

After being cooled, the fused product is stripped from the carrier surface, the printed film having a surface appearance directly conforming to the smoothness and polish of the carrier surface. The product can be rolled up or can be cut into tiles or other shapes depending on the particular use to which the product is to be put.

The embodiment of the invention illustrated on the drawing shows conventional hot air ovens above the upper surface of the carrier to effect the setting of the decorative composition and the foaming and fusing operations. This is not intended as a limitation, since any form of heating can be used, such as radiant heating units. Where a non-metal carrier surface is used, rapid heating of the resinous compositions can be brought about by dielectric heating means.

The drawing does not illustrate any specific cooling devices for cooling the sheet after each heating operation. Cooling is particularly important after the high temperature fusing and foaming, since premature stripping of the product from the carrier might cause the composition to flow and thus distort the decorative effect. Cooling can be effected by merely exposure to the atmosphere. The speed of the carrier belt and spacing of the processing units can be adjusted so that the product is given sufficient time to cool. Alternately, cooling can be accelerated by blowing jets of chilled air upon the composition applied to the carrier or by passing the carrier with composition applied thereto through a bath or sprays of water.

Although the invention as illustrated on the drawing has a decorative layer which is applied by means of flat bed printing technique wherein only two printing blocks are used, it is apparent that the number of printing blocks will be governed solely by the complexity of the design. The conventional flat bed printing machine has twenty-four printing stations; therefore, when designs of great complexity are to be produced, it is apparent that all the printing stations of a conventional flat bed printing machine can be used to produce products in accordance with the invention. The paint pot associated with each printing block will be filled with a supply of the decorative composition to be applied by that particular block; therefore, in the case of highly complex designs as many as twenty-four separate supplies of decorative compositions must be maintained.

The invention has been described in connection with the use of a flat bed printing machine for applying the decorative effect. It is apparent, however, that any of the conventional techniques of printing can be used, such as, for example, the high speed rotogravure printing technique. Printing methods like rotogravure are characterized by the fact that only a thin film of printing ink is actually applied. This normally is not of sufficient thickness to withstand any substantial amounts of wear to which it would be subjected in a typical floor covering installation. Therefore, when such printing techniques are used, the decorative printed film must normally be protected by a clear plastic wear layer. The smooth and glossy effect obtained in accordance with the invention can be produced in such products by casting a clear unpigmented organosol or plastisol composition onto a carrier surface, then heating to set the clear film followed by the application of the thin decorative film by printing. The product when stripped from the polished surface bears a decorative design protected by a smooth and glossy clear wearing surface. The printing composition used can be either a plastisol, organosol or conventional rotogravure printing ink which is normally a solution of plasticized vinyl chloride polymer in a volatile solvent in the presence of suitable pigments.

The decorative effect can, if desired, be created by applying the decorative composition to the carrier by any of the conventional techniques of coating, such as by doctor blade or by spraying. Where a decorative layer is formed upon a smooth carrier by coating, a single color effect is produced. A two color embossed product can also be produced where an embossed carrier is used. For example, a pigmented plastisol can be doctored over the surface of an embossed carrier, filling the depressions therein but leaving the high spots uncoated. After gelation of the plastisol, a layer of a second plastisol composition pigmented in a contrasting color can be applied to the carrier. The mass is again heated to gel the second plastisol and a foamable composition layer is applied to the exposed surface of the second plastisol layer. After heating to fuse the resins and decompose the blowing agent in the foamable composition layer, the product is stripped from the carrier. A two color embossed product is obtained, the high spots having the color of the first plastisol and the low spots having the color of the second plastisol. This technique can be varied by applying a first plastisol to the high spots of the embossed carrier followed by application of a second plastisol to fill the depressions in the embossed carrier.

The invention has been described in connection with preparation of a plastic surface covering having a decorative surface layer integrally and firmly bonded to a highly resilient backing. By virtue of the compatibility of the resins used in the decorative layer and in the backing, the product shows no tendency to delaminate between the two layers. It is apparent, of course, that where products are to be produced which do not require this extreme resistance to delamination, different compositions can be used in the formation of the highly resilient backing. For example, after the decoration composition has been applid to the carrier base and heated to become set, a conventional foam rubber latex can be applied in a uniform thickness film to the set decorative composition layer. Alternately, a foamable polyurethane coating system can be applied. In either case an adhesive layer on top of the set decorative composition layer may be required to improve the adhesion of the resilient foamable composition layer.

For some purposes the product does not require the use of a highly resilient foamed backing. For example, a decorative composition layer can be applied to a polished carrier in accordance with the invention followed by a heating step to fuse the composition to produce a product which can be used for some purposes without any backing whatever. Alternately, where products with somewhat greater strength are desired the fused decorative layer after being stripped from the polished carrier can be laminated to a felt or fabric backing in accordance with conventional laminating techniques well known in the plastic surface covering industry. However, where products are desired that have a high degree of resilience and comfort under foot, as well as unusually strong resistance to delamination, the method of the invention is particularly effective.

The following examples are presented for purposes of illustrating the invention:

Example I

A plastisol was formulated by grinding the following ingredients on a conventional three-roll mill:

| | Parts |
|---|---|
| Polyvinyl chloride (dispersion grade) | 100 |
| Didecyl adipate | 100 |
| Stabilizer | 5 |

The finished composition had a viscosity of 4,000 centipoises at 25° C. as measured with a Brookfield viscometer using a No. 6 spindle at 10 r.p.m. This plastisol can be pigmented to produce a suitable printing composition or can be blended with an effective amount of a blowing agent to produce a foamable composition for use in accordance with the invention.

Example II

An organosol was formulated by grinding the following ingredients on a three-roll mill:

| | Parts |
|---|---|
| Polyvinyl chloride | 100 |
| Dioctyl phthalate | 30 |
| Tricresyl phosphate | 20 |
| V.M. and P naphtha | 20 |
| Methylethyl ketone | 2 |
| Stabilizer | 5 |

As in case of the plastisol, dispersion grade resin was used. This organosol can be used as produced for the application of a clear wearing surface or it can be pigmented and used as a decorative composition in the production of products in accordance with the invention.

Example III

A batch of the plastisol of Example I was blended with three parts of a blue-green pigment and a second batch of the same plastisol was blended with three parts of a yellow pigment. These two batches were used as printing fluids in the application of a two color design by printing upon a highly polished metal plate. The plate bore a coating of a silicone release fluid.

The printed film was gelled by placing the polished plate with the printed film thereon in an oven maintained at 225° F. for 2 minutes. The plate was cooled by exposure to the atmosphere.

A foamable plastisol composition was produced by blending three parts of azodiformamide blowing agent with the plastisol formulation of Example I. The resulting foamable plastisol was applied by a doctor blade in an 0.005 inch thick film to the gelled printed film. The metal plate with both films applied thereto was placed in a hot air oven maintained at a temperature of 400° F. for 3 minutes. As a result, the compositions of the printed film and the foamable film became fused and bonded one to another and the blowing agent in the foamable film completely decomposed, bringing about a five-fold increase in thickness of the foamable film. The product was removed from the oven, allowed to cool by exposure to the atmosphere and was stripped from the polished plate. A decorative surface firmly bonded to a highly resilient foam backing was produced.

Example IV

The clear unpigmented organosol of Example II was applied in a film 0.004 inch thick by a doctor blade to a polished metal plate coated with a silicone release fluid. The clear film was gelled and the volatile solvent substantially removed by placing the plate in an oven maintained at 225° F. for 5 minutes. The plate was then cooled by exposure to the atmosphere.

Two pigmented batches of organosol printing fluid were prepared by adding three parts of red pigment to the organosol of Example II to form the first batch and adding three parts of yellow pigment to the organosol of Example II to form the second batch. These printing fluids were applied in a very thin film by means of an etched printing plate, thereby duplicating printing by rotogravure technique. The metal plate was again placed in the oven maintained at 225° F. for 5 minutes to gel the thin printed film and remove substantially all the volatile solvents.

A foamable plastisol composition was produced by adding three parts of azodiformamide to the plastisol of Example I. The resulting foamable plastisol was applied as a film 0.005 inch thick to the heat set printing fluid. The metal plate was then placed in an oven at 400° F. for 3 minutes wherein the composition layers were fused and bonded one to another under the influence of the heat. The blowing agent was decomposed causing a five-fold expansion in thickness of the foamable layer. The resulting product was stripped from the metal plate yielding a highly resilient foam backed printed surface covering wherein the decorative design was protected by a clear smooth and mirror-like wearing surface.

Any departure from the above description which conforms to the present invention is intended to be included within the scope of the claims.

I claim:

1. A method of producing a decorative surface covering having a wear layer in the form of a uniform, thick layer with a multicolored design extending uniformly throughout its thickness which is identical from the upper surface of said layer to its back, which comprises printing individually a series of thermoplastic vinyl resinous compositions of contrasting pigmentation on a polished carrier to form a continuous uniform multicolored decorative layer having a substantial thickness, each of said compositions having a viscosity between about 200 and about 25,000 centipoises at 25° C. as measured by Brookfield viscometer using a No. 6 spindle at 10 r.p.m. and being selected from the group consisting of organosols and plastisols of a vinyl resin, heating said printed layer to at least partially fuse said compositions, coating the exposed surface of said decorative layer with a foamable vinyl resin composition, heating the two layers to fuse and bond the layers together and foam the foamable composition and stripping the fused and foamed layers from said carrier surface.

2. The process of claim 1 wherein said vinyl resins are polymers of vinyl chloride.

3. The process of claim 2 wherein said organosols comprise about 50 to about 150 parts plasticizer and about 1 to about 80 parts organic solvent to 100 parts vinyl chloride resin and said plastisols comprise about 50 to about 150 parts plasticizer per 100 parts vinyl chloride resin and said foamable composition is a plastisol comprising about 50 to about 150 parts plasticizer to 100 parts vinyl chloride resin and about 1 to about 20 parts blowing agent to 100 parts vinyl chloride resin.

4. The process of claim 3 wherein said blowing agent decomposes at a temperature above the fusion temperature of said vinyl chloride compositions but less than about 450° F.

(References on following page)

References Cited in the file of this patent

UNITED STATES PATENTS

| | | |
|---|---|---|
| Re. 24,114 | Adler | Jan. 24, 1956 |
| 2,113,158 | Mayer | Apr. 5, 1938 |
| 2,382,784 | Emery | Aug. 14, 1945 |
| 2,486,258 | Chavannes | Oct. 25, 1949 |
| 2,526,634 | Chavannes | Oct. 24, 1950 |
| 2,571,962 | Smith et al. | Oct. 16, 1951 |
| 2,590,032 | Petry | Mar. 18, 1952 |
| 2,706,833 | Doherty | Apr. 26, 1955 |
| 2,816,852 | Banks | Dec. 17, 1957 |
| 2,823,479 | Zdanoski | Feb. 18, 1958 |
| 2,827,411 | Cole | Mar. 18, 1958 |
| 2,874,416 | Burnett | Feb. 24, 1959 |

FOREIGN PATENTS

| | | |
|---|---|---|
| 1,084,215 | France | Jan. 18, 1955 |
| 725,100 | Great Britain | Mar. 2, 1955 |